(12) United States Patent
Iriyama (10) Patent No.: US 11,524,447 B2
(45) Date of Patent: Dec. 13, 2022

(54) PRESSURE VESSEL AND MANUFACTURING METHOD THEREOF

(71) Applicant: TOYOTA JIDOSHA KABUSHIKI KAISHA, Aichi-ken (JP)

(72) Inventor: Yojiro Iriyama, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 13 days.

(21) Appl. No.: 17/083,297

(22) Filed: Oct. 29, 2020

(65) Prior Publication Data
US 2021/0138717 A1    May 13, 2021

(30) Foreign Application Priority Data
Nov. 11, 2019 (JP) .............................. JP2019-203931

(51) Int. Cl.
| F17C 1/02 | (2006.01) |
| B29C 63/00 | (2006.01) |
| B29C 63/24 | (2006.01) |
| B29K 101/10 | (2006.01) |
| B29L 31/00 | (2006.01) |

(52) U.S. Cl.
CPC .......... B29C 63/0073 (2013.01); B29C 63/24 (2013.01); F17C 1/02 (2013.01); *B29K 2101/10* (2013.01); *B29L 2031/712* (2013.01); *F17C 2201/0109* (2013.01); *F17C 2203/012* (2013.01); *F17C 2203/066* (2013.01); *F17C 2203/067* (2013.01); *F17C 2203/0619* (2013.01); *F17C 2209/2109* (2013.01); *F17C 2209/2154* (2013.01)

(58) Field of Classification Search
CPC ................ F17C 1/02; F17C 2201/0109; F17C 2203/012; F17C 2203/0619; F17C 2203/066; F17C 2203/067; F17C 2209/2154
See application file for complete search history.

(56) References Cited

U.S. PATENT DOCUMENTS

| 3,335,904 | A | * | 8/1967 | Anderson | .............. | B65D 88/76 |
| | | | | | | 220/560.04 |
| 3,874,544 | A | * | 4/1975 | Harmon | .................... | F17C 1/16 |
| | | | | | | 138/140 |
| 5,676,330 | A | * | 10/1997 | Zhu | .......................... | F17C 1/06 |
| | | | | | | 242/444 |
| 2005/0006394 | A1 | * | 1/2005 | Fujihara | .................... | F17C 1/06 |
| | | | | | | 220/581 |
| 2019/0024848 | A1 | * | 1/2019 | Villareal | ............... | F17C 13/083 |

FOREIGN PATENT DOCUMENTS

| CN | 103383057 A | 11/2013 |
| CN | 206723815 U | 12/2017 |
| JP | 2017122464 A | 7/2017 |

* cited by examiner

*Primary Examiner* — Don M Anderson
(74) *Attorney, Agent, or Firm* — Hauptman Ham, LLP

(57) ABSTRACT

A pressure vessel includes a vessel body including a cylindrical-shaped straight body portion with a spiral-shaped projection portion formed at an outer peripheral surface of the straight body portion, and a covering portion that comprises a fiber bundle wrapped onto the outer peripheral surface of the straight body portion in a spiral pattern running parallel to the projection portion so as to cover the outer peripheral surface of the straight body portion.

13 Claims, 5 Drawing Sheets

PRESSURE VESSEL AND MANUFACTURING METHOD THEREOF

CROSS-REFERENCE TO RELATED APPLICATION

This application is based upon and claims the benefit of priority of the prior Japanese Patent Application No. 2019-203931, filed on Nov. 11, 2019, the entire contents of which are incorporated herein by reference.

FIELD

The embodiments discussed herein are related to pressure vessels and manufacturing methods thereof.

Japanese Patent Application Laid-Open (JP-A) No. 2017-122464 describes a pressure vessel. The pressure vessel is a fiber-reinforced resin layer formed by winding a fiber bundle on an outer peripheral surface of a liner formed to have a parting line along a boundary of a mold.

However, in the configuration described in Japanese Patent Application Laid-Open (JP-A) No. 2017-122464, there are a plurality of protrusions formed in a ring shape on the outer peripheral surface of the liner by a parting line or vacuum drawing when the liner is extrusion-molded. With this configuration, when the fiber bundle is helically wound around the outer peripheral surface of the liner, a part of the fiber bundle gets over the parting line or the protrusion. Therefore, at a portion where a part of the fiber bundle gets over the parting line or the protrusion, a part of the fiber bundle lifts off from the outer peripheral surface of the liner.

If a part of the fiber bundle lifts off from the outer peripheral surface of the liner, the fiber bundle is not sufficiently adhered to the outer peripheral surface of the liner around the parting line or the protrusion. As a result, the fiber content in the part around the parting line or the protrusion may decrease, and the strength of the part may decrease. As a countermeasure, it is conceivable to increase the amount of fiber bundles and increase the strength of a part around the parting line or the protrusion. However, increasing the amount of fiber bundles increases the mass and manufacturing cost of the pressure vessel.

SUMMARY

An object of the present disclosure is to obtain a pressure vessel and a manufacturing method thereof which can suppress increases in mass and manufacturing costs.

A pressure vessel of a first aspect includes a vessel body that includes a cylindrical-shaped straight body portion with a spiral-shaped projection portion formed at an outer peripheral surface of the straight body portion, and a covering portion that comprises a fiber bundle wrapped onto the outer peripheral surface of the straight body portion in a spiral pattern running parallel to the projection portion so as to cover the outer peripheral surface of the straight body portion.

In the pressure vessel of the first aspect, the spiral-shaped projection portion is formed at the outer peripheral surface of the cylindrical-shaped straight body portion of the vessel body. Further, the fiber bundle is wrapped in a spiral pattern running parallel to the projection portion. Therefore, the fiber bundle is not wrapped in a manner that causes the fiber bundle to go over the projection portion, and the fiber bundle does not lift off from the outer peripheral surface of the straight body portion. That is, the fiber bundle also makes sufficiently close contact with the outer peripheral surface of the straight body portion at the periphery of the projection portion, a reduction in fiber content at a location including the periphery of the projection portion is prevented, and a reduction in strength at the location including the periphery of the projection portion is prevented. Therefore, the necessary amount of the fiber bundle can be kept to a minimum, and an increase in the mass and an increase in the manufacturing costs of the pressure vessel are suppressed. It should be noted that "parallel" in the present disclosure includes being absolutely parallel as well as being substantially parallel with a slight deviation from being absolutely parallel.

A pressure vessel of a second aspect is the pressure vessel of the first aspect, wherein a height of the projection portion is equal to or less than a thickness of the fiber bundle.

In the pressure vessel of the second aspect, the height of the projection portion is equal to or less than the thickness of the fiber bundle. Therefore, when wrapping a second layer of the fiber bundle, the projection portion does not protrude beyond the fiber bundle wrapped in a first layer. As a result, the fiber bundle can be wrapped without being affected by the projection portion. That is, even when wrapping the fiber bundle in the second layer, the wrapping does not cause the fiber bundle in the second layer to go over the projection portion. In other words, when wrapping the fiber bundle in the second layer, the fiber bundle in the second layer does not lift due to the projection portion.

A pressure vessel of a third aspect is the pressure vessel of the first aspect. In the pressure vessel of the third aspect, a wrapping angle $\theta$ of the fiber bundle with respect to an axial direction of the vessel body is within a range of 54.7°±10°.

A pressure vessel of a fourth aspect is the pressure vessel of the third aspect. In the pressure vessel of the fourth aspect, an inclination angle of the projection portion with respect to the axial direction of the vessel body is within a range of 54.7°±10°.

A pressure vessel of a fifth aspect is the pressure vessel of the first aspect. In the pressure vessel of the fifth aspect, the covering portion includes a first layer of the fiber bundle wrapped onto the outer peripheral surface of the straight body portion in the spiral pattern running parallel to the projection portion, and a second layer above the first layer, the second layer comprising a fiber bundle wrapped in a spiral pattern in a direction that intersects with the projection portion.

A pressure vessel of a sixth aspect is the pressure vessel of the first aspect. In the pressure vessel of the sixth aspect, the covering portion includes a thermosetting resin impregnated into the fiber bundle and cured to harden the fiber bundle.

A pressure vessel manufacturing method of a seventh aspect includes a molding process of molding a vessel body that comprises a cylindrical-shaped straight body portion such that a spiral-shaped projection portion is formed at an outer peripheral surface of the cylindrical-shaped straight body portion, and a wrapping process of wrapping a fiber bundle onto the outer peripheral surface of the straight body portion in a spiral pattern running parallel to the projection portion so as to cover the outer peripheral surface of the straight body portion.

In the pressure vessel manufacturing method of the seventh aspect, the spiral-shaped projection portion is formed at the outer peripheral surface of the cylindrical-shaped straight body portion of the vessel body. The fiber bundle is wrapped in a spiral pattern running parallel to the projection portion. Therefore, the fiber bundle is not wrapped in a manner that causes the fiber bundle to go over the projection portion, and the fiber bundle does not lift off from the outer peripheral surface of the straight body portion. That is, the fiber bundle also makes sufficiently close contact with the outer peripheral surface of the straight body portion at the periphery of the projection portion, a reduction in fiber content at a location including the periphery of the projection portion is prevented, and a reduction in strength at the location including the periphery of the projection portion is prevented. Therefore, the necessary amount of the fiber bundle can be kept to a minimum, and an increase in the mass and an increase in the manufacturing costs of the pressure vessel are suppressed. It should be noted that "parallel" in the present disclosure includes being absolutely parallel as well as being substantially parallel with a slight deviation from being absolutely parallel.

A pressure vessel manufacturing method of an eighth aspect is the pressure vessel manufacturing method of the seventh aspect, wherein, in the molding process, a height of the projection portion is made to be equal to or less than a thickness of the fiber bundle.

In the pressure vessel manufacturing method of the eighth aspect, in the molding process, the height of the projection portion is made to be equal to or less than a thickness of the fiber bundle. Therefore, when wrapping a second layer of the fiber bundle, the projection portion does not protrude beyond the fiber bundle wrapped in a first layer. As a result, the fiber bundle can be wrapped without being affected by the projection portion. That is, even when wrapping the fiber bundle in the second layer, the wrapping does not cause the fiber bundle in the second layer to go over the projection portion. In other words, when wrapping the fiber bundle in the second layer, the fiber bundle in the second layer is not lifted due to the projection portion.

A pressure vessel manufacturing method of a ninth aspect is the pressure vessel manufacturing method of the seventh aspect. In pressure vessel manufacturing method of a ninth aspect, a wrapping angle θ of the fiber bundle with respect to an axial direction of the vessel body is within a range of 54.7°±10°.

A pressure vessel manufacturing method of a tenth aspect is the pressure vessel manufacturing method of the ninth aspect. In the pressure vessel manufacturing method of a tenth aspect is the pressure vessel manufacturing method of the ninth aspect, an inclination angle of the projection portion with respect to the axial direction of the vessel body is within a range of 54.7°±10°.

A pressure vessel manufacturing method of an eleventh aspect is the pressure vessel manufacturing method of the seventh aspect. In the pressure vessel manufacturing method of an eleventh aspect, the wrapping process includes wrapping a first layer of the fiber bundle onto the outer peripheral surface of the straight body portion in the spiral pattern running parallel to the projection portion, and wrapping a second layer above the first layer, by wrapping a fiber bundle in a spiral pattern in a direction that intersects with the projection portion.

A pressure vessel manufacturing method of a twelfth aspect is the pressure vessel manufacturing method of the seventh aspect. The pressure vessel manufacturing method of a twelfth aspect further includes after the wrapping process, a hardening process of impregnating a thermosetting resin into the fiber bundle that is wrapped onto the outer peripheral surface of the straight body portion and heating the fiber bundle.

The technology of the present disclosure makes it possible to suppress increases in mass and manufacturing costs of a pressure vessel.

DESCRIPTION OF EMBODIMENTS

Hereinafter, an exemplary embodiment according to the present disclosure will be described in detail based on the drawings. Note that, for convenience of description, an arrow S appropriately shown in some drawing is an axial direction of the pressure container 10, and an arrow C is a circumferential direction of the pressure container 10. Further, in the pressure vessel 10 according to at least one embodiment, the pressure vessel 10 is filled with, for example, hydrogen as a fuel. For example, the pressure vessel 10 is mounted on a fuel cell vehicle or the like. Illustration of a fuel cell vehicle is omitted.

Figure 1:
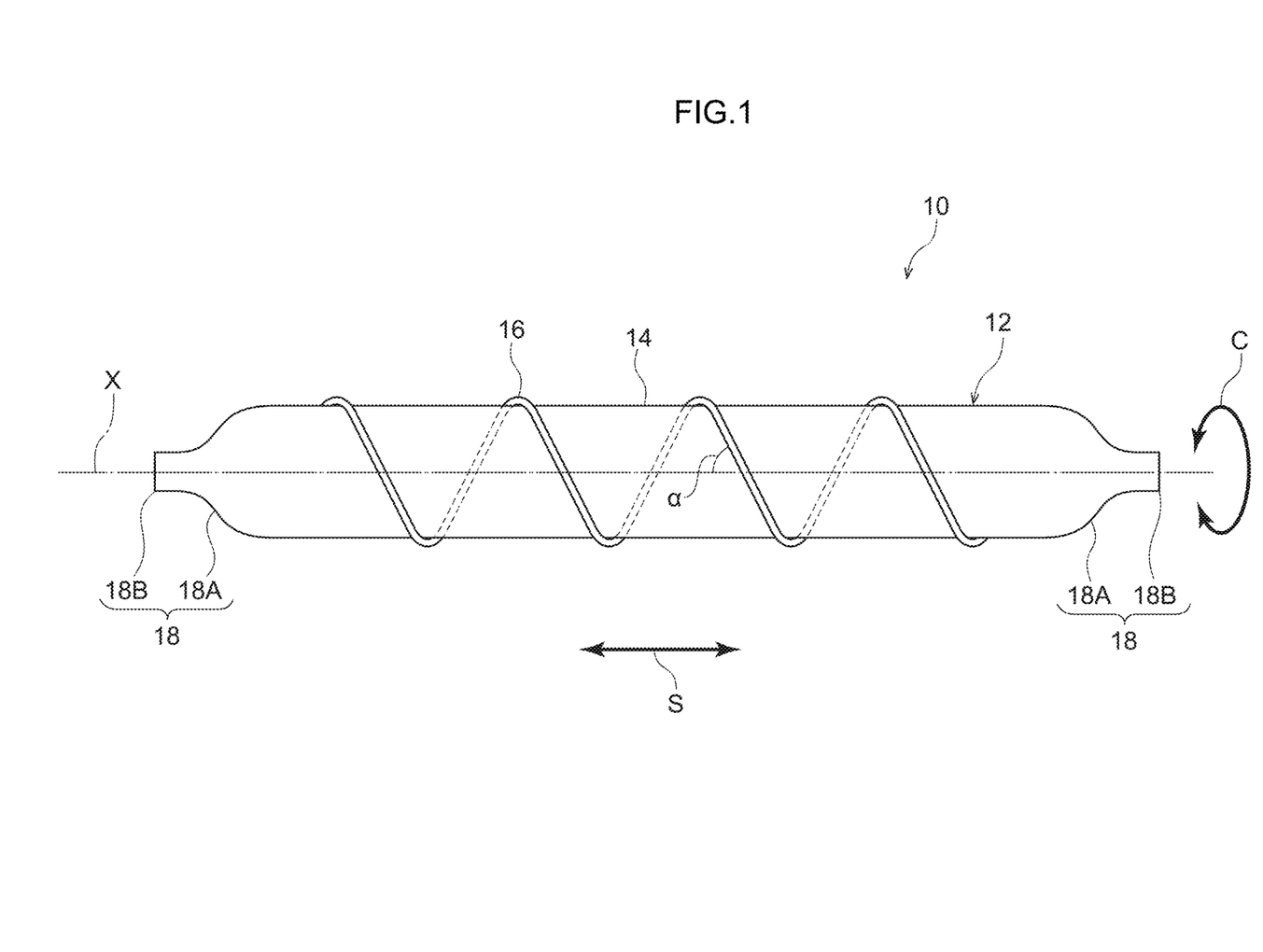
FIG. 1 is a side view showing a container body of a pressure container according to an embodiment.

As shown in FIG. 1, the pressure vessel 10 includes a container body 12 as an example of a vessel body, also referred to as a liner. As an example, the container body 12 is formed of a liquid crystal resin material having excellent gas barrier properties and excellent dimensional stability. The container body 12 includes a straight body portion 14 and a dome portion 18. The straight body portion 14 has a cylindrical shape. The dome portions 18 are integrally formed at both ends of the straight body portion 14 and each include a hemispherical portion 18A, which is substantially hemispherical.

In addition, a spiral shaped protrusion 16 as an example of the projection portion is integrally formed on the outer peripheral surface of the straight body portion 14. The protrusion 16 is formed by creating a vacuum when the container body 12 is extrusion-molded. More specifically, the protrusion 16 is formed by closely contacting the liquid crystal resin material with a spiral shaped slit formed on the inner peripheral surface of the mold. Illustration of the mold is omitted. Illustration of the spiral shaped slit portion is omitted. As an example, a vacuum pump (not shown) is connected to the slit portion. By operating the vacuum pump, the liquid crystal resin material is adhered to the slit portion, so that the protrusion 16 of the container body 12 is molded in the mold.

Note that the width of the protrusion 16 is preferably as narrow as possible from the perspective of winding the fiber bundle 20 described later. Therefore, in the mold, the width of the slit portion is set to be narrow. The height of the protrusion 16 is set to be equal to or less than the thickness of the fiber bundle 20 described later. That is, although exaggerated in FIG. 1, the protrusion 16 is formed with a height the same as the thickness of the fiber bundle 20 or slightly lower than the thickness of the fiber bundle 20. The thickness of the fiber bundle 20 is, for example, 0.5 mm, and the height of the protrusion 16 is, for example, 0.3 mm. Further, the inclination angle α of the protrusion 16 with respect to the central axis X of the container body 12 is substantially the same as the winding angle θ described later. Herein, the wording "substantially the same" includes the case in which the inclination angle of the protrusion 16 is the same as the winding angle θ. Further, the wording "substantially the same" includes the case in which the inclination angle of the protrusion 16 is slightly smaller than the winding angle θ. In addition, the wording "substantially the same" includes the case in which the inclination angle of the protrusion 16 is slightly larger than the winding angle θ.

Figure 2:
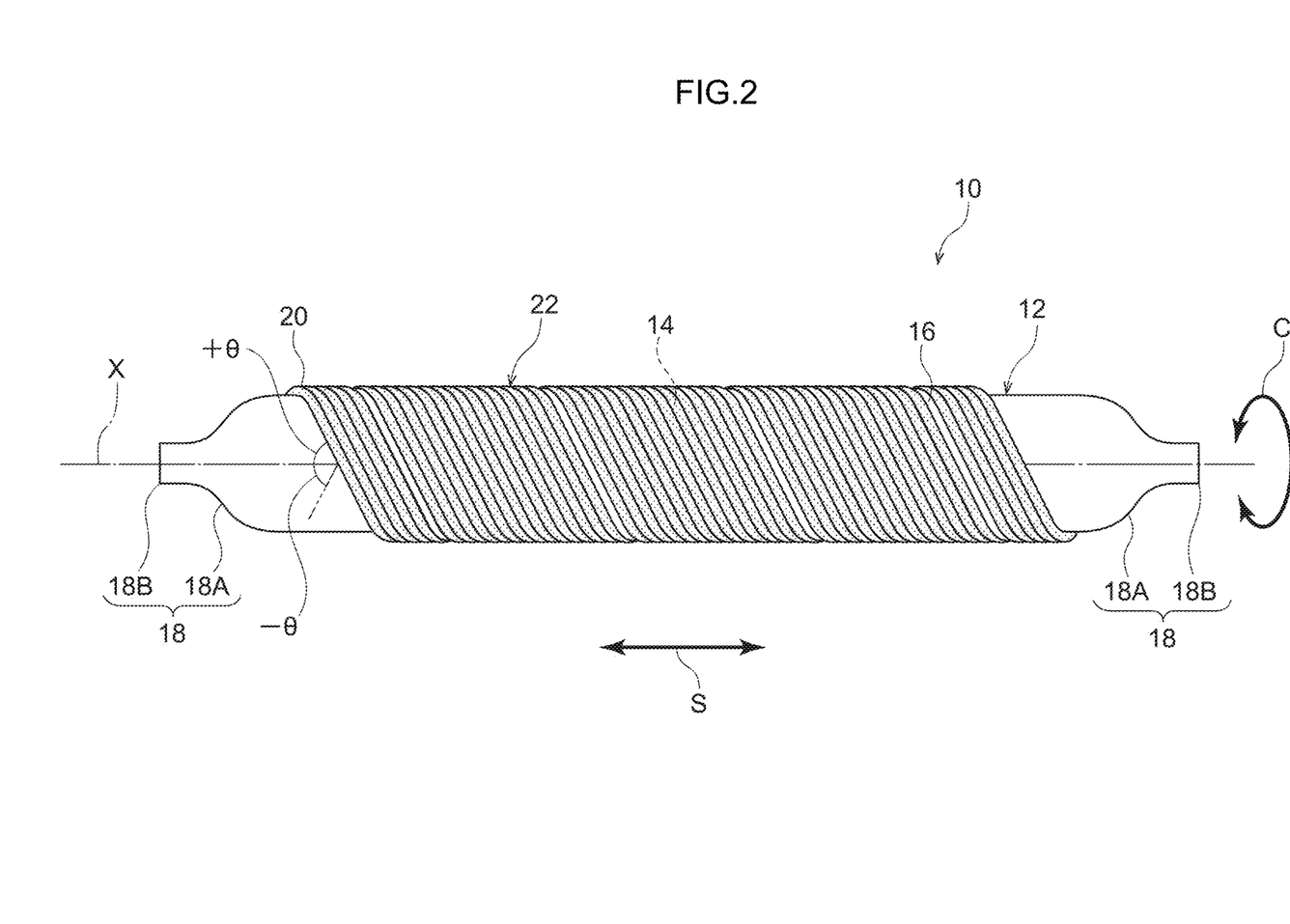
FIG. 2 is a side view showing a partly wound state of the fiber bundle around the container body of the pressure container according to an embodiment.
Figure 3:
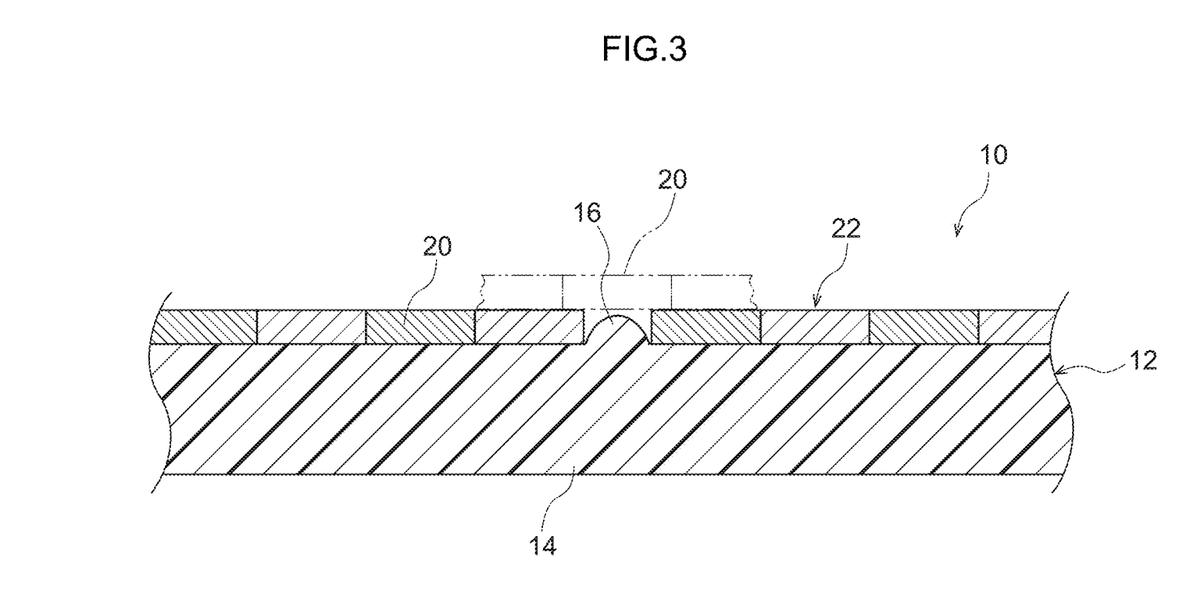
FIG. 3 is an enlarged cross-sectional view showing a part of the pressure vessel according to an embodiment.

As shown in FIGS. 2 and 3, in the pressure vessel 10, the band shaped fiber bundle 20 of a predetermined width is wrapped onto the outer peripheral face of the straight barrel 14 of the vessel body 12 in a spiral pattern, so as to be substantially parallel to the projection 16 and such that there are no gaps. The term "parallel" in the present disclosure includes the case where the fiber bundle 20 is exactly parallel to the protruding portion 16 and also includes substantially parallel. The term "substantially parallel" includes the case in which there is slight deviation from the fiber bundle 20 being exactly parallel to the protrusion 16. Examples of the case where there is a slight deviation from the accurate parallel include a case in which the difference between the winding angle θ of the fiber bundle 20 and the inclination angle α of the protrusion 16 with respect to the central axis X of the container body 12 is within 10 degrees. For example, the difference between the winding angle θ of the fiber bundle 20 and the inclination angle α of the protrusion 16 is preferably within 10 degrees. The difference between the winding angle θ of the fiber bundle 20 and the inclination angle α of the protrusion 16 is preferably 5 degrees or less, and more preferably 1 degree or less. Further, the pressure vessel 10 is configured such that the fiber bundle 20 is wound around the outer peripheral surface of the dome portion 18 without any gap. However, FIG. 2 shows a state in which the fiber bundle 20 is partially wound around only the straight body portion 14. In addition, the thickness of the fiber bundle 20 is also exaggerated in FIG. 2.

The fiber bundle 20 is made of fiber reinforced resin including glass fiber, carbon fiber, aramid fiber, or the like. In an example, the fiber reinforced resin comprises fiber-reinforced plastic or fiber-reinforced polymer (FRP). The fiber bundle 20 forms a fiber reinforced resin layer 22 that covers the entire outer peripheral surface of the container body 12. The fiber reinforced resin layer 22 is an example of a covering portion. More specifically, the fiber bundle 20 is helically wound around the outer peripheral surface of the straight body portion 14. Hereinafter, the fact that the fiber bundle 20 is helically wound is referred to as "helical winding". The reinforcing layer 22 is formed by the helically wound fiber bundle 20.

Helical winding refers to the following winding state. The fiber bundle 20 is wound around the entire outer peripheral surface of the straight body portion 14 at a predetermined winding angle +θ with respect to the central axis X of the container body 12. Thereafter, the fiber bundle 20 is folded back at one end side in the axial direction of the container body 12, and the second layer fiber bundle 20 is wrapped on top of the first layer fiber bundle 20 at a predetermined winding angle −θ with respect to the central axis X of the container body 12. Illustration of such winding process of the fiber bundle 20 is omitted. The fiber bundle 20 of the second layer intersects with and is wound on the fiber bundle 20 of the first layer wound at the winding angle +θ.

That is, the reinforcing layer 22 is formed by winding at least two layers of the fiber bundle 20 on the outer peripheral surface of the straight body portion 14 at a predetermined winding angle +θ and a predetermined winding angle −θ. The fiber bundle 20 is preferably wound so as to be a plurality of layers of two or more layers. Note that the number of layers of the fiber bundle 20 depends on the internal pressure of the straight body portion 14, the number of fibers in the fiber bundle 20, and the like. For example, the fiber bundle 20 is actually wound as a second layer at a winding angle of −θ and then folded back at the other axial end of the container body 12. Further, the fiber bundle 20 is wound as the third layer from the top of the fiber bundle 20 of the second layer at the winding angle +θ. The winding of the fiber bundle 20 is sequentially repeated from the fourth layer on, so that the fiber bundle 20 having a plurality of layers is reciprocated. For example, the fiber bundle 20 is adapted to be wound in any one of, for example, 10 to 20 layers.

Further, the fiber bundles 20 are wound around the outer peripheral surface of the dome portion 18 so as to be alternately woven. Hereinafter, the fact that the fiber bundle 20 is wound so that it is alternately knitted is referred to as "braiding winding". Illustration of the state in which the fiber bundle 20 is wound by braiding is omitted. At the dome portion 18, the reinforcing layer 22 is formed by the braided fiber bundle 20. The term "braiding winding" as used herein means that the fiber bundle 20 is wound so as to be alternately knitted at a predetermined winding angle +θ and a predetermined winding angle −θ with respect to the central axis X of the container body 12.

That is, the helical winding and the braiding winding are wound at the same winding angle θ. Including tolerance, it is preferable for the wrapping angle θ of the fiber bundle 20 to be within a range of θ=54.7 degrees±10 degrees with respect to the central axis X of the container body 12. The wrapping angle θ of the fiber bundle 20 is more preferably within a range of θ=54.7 degrees±5 degrees, and is even more preferably within a range of θ=54.7 degrees±1 degree.

The winding angle θ is an angle derived from the stress in the straight body portion 14 when a predetermined internal pressure is applied. The stress in the straight body portion 14 is the stress in the axial direction and the stress in the circumferential direction. That is, the winding angle θ is an angle resulting from the stress in the circumferential direction being twice as large as the stress in the axial direction. According to netting theory, calculating the wrapping angle θ according to stress, since $\tan^2\theta=2$, this leads to θ=54.7 degrees θ=54.7 degrees is the equilibrium angle. Detailed calculation formulas regarding netting theory are omitted.

Further, the dome portion 18 has less stress than the straight body portion 14 when the internal pressure is applied. As a result, the degree of reinforcement is smaller than that of the straight body portion 14. Therefore, the dome portion 18 has a braiding winding having a lower strength than the helical winding, and the straight body portion 14 has a helical winding having a higher strength than the braiding winding. Note that the fiber bundle 20 is wound around the outer peripheral surface of the container body 12 using a manufacturing device for winding the fiber bundle.

Further, as shown in FIGS. 1 and 2, the dome portion 18 includes a hemispherical portion 18A and a cylindrical portion 18B. The dome portions 18 are provided on both sides of the container body 12 in the axial direction. The cylindrical portion 18B projects from the hemispherical portion 18A. That is, in the axial center portion of the dome portion 18, the cylindrical portion 18B projects outward in the axial direction of the central axis X of the container body 12. As an example, a sealing plug is fitted to one cylindrical portion 18B, and a base plug is fitted to the other cylindrical portion 18B. A valve is attached to the base plug. Illustrations of the sealing plug, the base plug, and the valve are omitted.

In the pressure vessel 10 configured as described above, the operation of the pressure vessel 10 will be described next.

Figure 4:
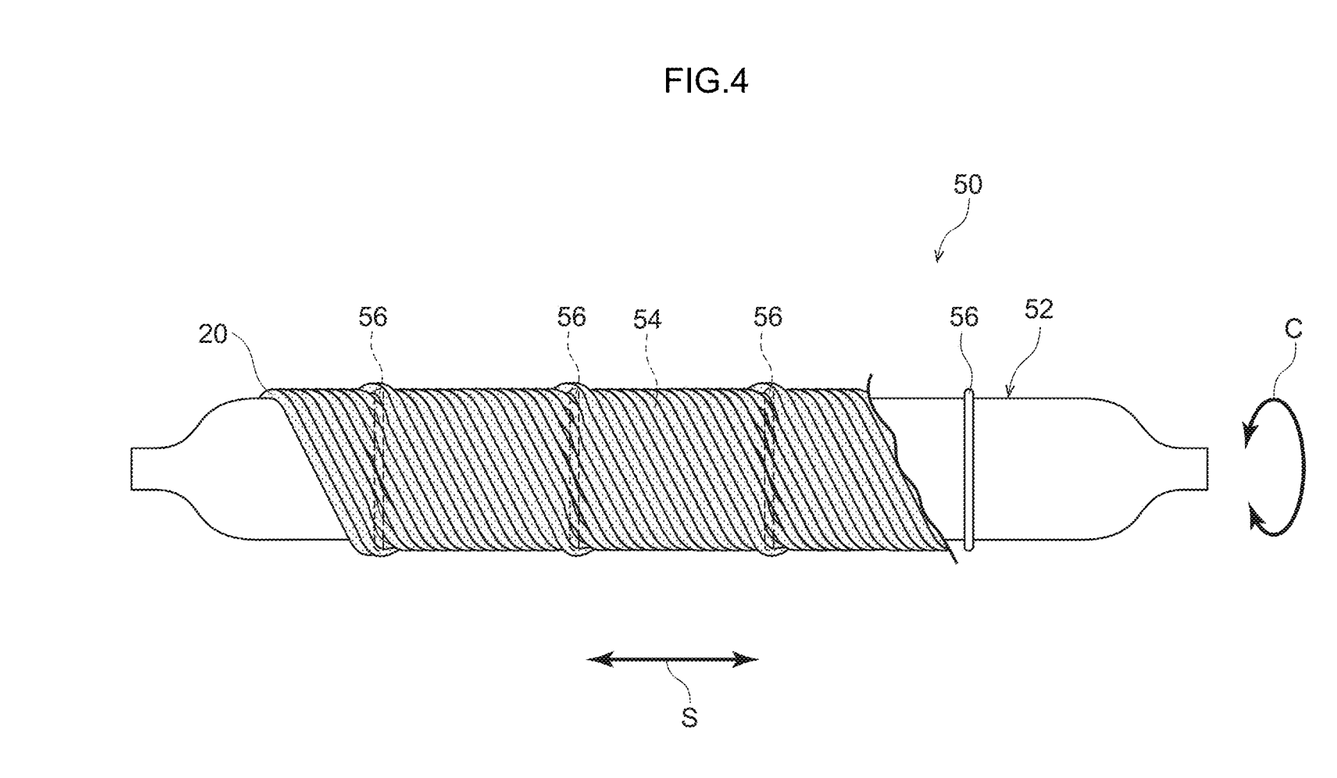
FIG. 4 is a side view showing a partly wound state of the fiber bundle around the container body of the pressure container according to a comparative example.
Figure 5:
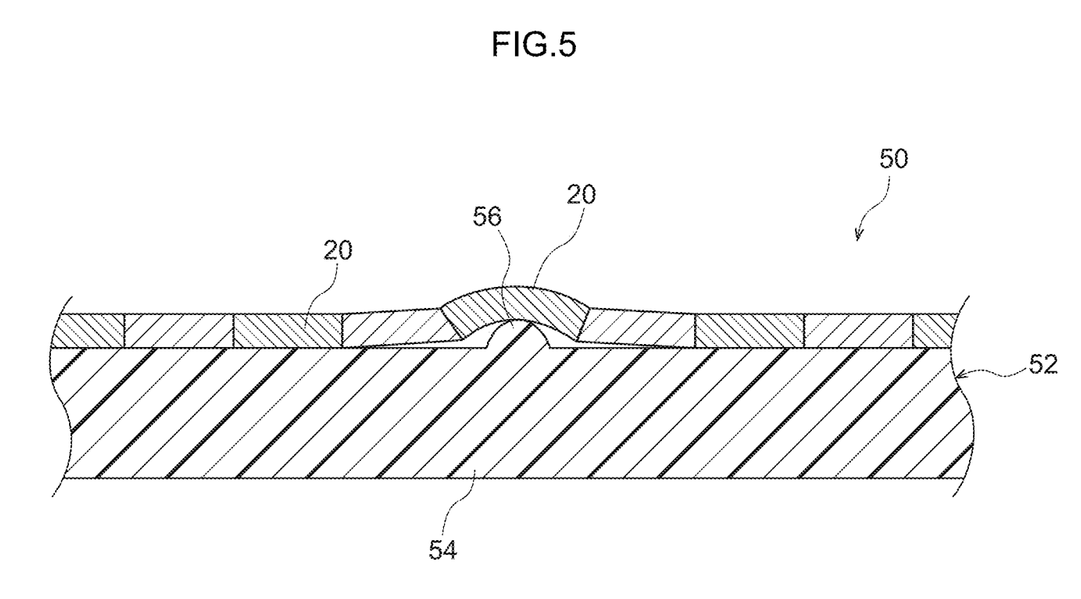
FIG. 5 is an enlarged cross-sectional view showing a part of a pressure vessel according to a comparative example.

First, a pressure vessel 50 according to the comparative example will be described. As shown in FIGS. 4 and 5, in the pressure vessel 50, a plurality of ring-shaped protrusions 56 along the circumferential direction are formed on the outer peripheral surface of the straight body portion 54 of the vessel body 52 at intervals in the axial direction. In the illustrated pressure vessel 50, four protrusions 56 are formed. Therefore, as shown in FIG. 5, when the fiber bundle 20 is spirally wound around the outer peripheral surface of the straight body portion 54 without a gap, a part of the fiber bundle 20 gets over the protrusion 56 as the fiber bundle 20 is being wound.

That is, at a portion where a part of the fiber bundle 20 gets over the protrusion 56, a part of the fiber bundle 20 lifts off from the outer peripheral surface of the straight body part 54. When a part of the fiber bundle 20 lifts off from the outer peripheral surface of the straight body portion 54, the fiber bundle 20 is not sufficiently adhered to the outer peripheral surface of the straight body portion 54 around the protrusion 56. As a result, the fiber content in the region near the protrusion 56 decreases, and the strength in the region near the protrusion 56 decreases. However, if the amount of the fiber bundle 20 is increased and the strength of the portion near the protrusion 56 is increased, the mass and manufacturing cost of the pressure vessel 50 increase.

On the other hand, on the outer peripheral surface of the straight body portion 14 of the container body 12 in the pressure vessel 10 according to at least one embodiment, as shown in FIG. 1, the projection 16 is formed in a spiral shape inclined by the predetermined inclination angle α with respect to the central axis X of the container body 12. That is, the container body 12 is formed so that the spiral shaped protrusion 16 is formed on the outer peripheral surface of the straight body portion 14. The process of molding the container body 12 is a molding process.

Therefore, as shown in FIG. 2, when the fiber bundle 20 is wound so as to cover the outer peripheral surface of the straight body portion 14, the fiber bundle 20 can be wound in a spiral shape along the protruding portion 16 without a gap. The fiber bundle 20 is wound substantially parallel to the protrusion 16 at a winding angle θ. The step of winding the fiber bundle 20 is a winding step as an example of a wrapping process. That is, in the case of the pressure vessel 10 according to at least one embodiment, as shown in FIG. 3, the fiber bundle 20 is not wound in a manner that causes the fiber bundle 20 to get over the projection 16, and the fiber bundle 20 does not lift off from the outer peripheral face of the straight body portion 14. The portions that 20 and 22 point to in FIG. 3 are one/same material (band/tape) and the different hatching patterns merely distinguish odd turns (e.g., the portion pointed at by 20) from even turns (e.g., the portion pointed at by 22).

Therefore, the fiber bundle 20 is sufficiently brought into close contact with the outer peripheral surface of the straight body portion 14 around the protruding portion 16. The periphery of the protrusion 16 is a portion including the root portion of the protrusion 16. As a result, it is possible to prevent a decrease in the fiber content rate in the area around the protrusion 16, and it is possible to prevent a decrease in the strength in the area around the protrusion 16. Therefore, the minimum amount of the fiber bundle 20 is sufficient. In other words, in the pressure vessel 10, the desired strength can be obtained with the minimum necessary fiber bundle 20. As a result, in the pressure vessel 10, an increase in mass and an increase in manufacturing cost can be suppressed.

Further, in the molding step, the height of the protrusion 16 is formed to be the same as the thickness of the fiber bundle 20 or slightly lower than the thickness of the fiber bundle 20. Therefore, when the winding angle is changed and the second layer fiber bundle 20 is wound, the protrusion 16 does not protrude from the fiber bundle 20 wound in the first layer. For example, when the wrapping angle is changed and the fiber bundle 20 of the second layer is wound, the wrapping angle is changed from +θ to −θ. Further, for example, when the fiber bundle 20 of the second layer is wound, it is helically wound. As a result, the fiber bundle 20 can be wound without being affected by the protrusion 16.

That is, even when the fiber bundle 20 of the second layer is wound, the fiber bundle 20 of the second layer does not go over the protrusion 16 as the second layer is being wound. That is, the fiber bundle 20 of the second layer does not lift off due to the protrusion 16. For example, as shown in FIG. 3, the fiber bundle 20 in the second layer is wound so as to pass radially outside the top of the protrusion 16 without contacting the top of the protrusion 16.

Further, in the straight body portion 14, the fiber bundle 20 is helically wound instead of braiding winding. As a result, even in the straight body portion 14, the amount of the fiber bundle 20 required for ensuring the strength can be reduced as compared with the case in which the fiber bundle 20 is wound by braiding. As a result, in the pressure vessel 10, an increase in mass and an increase in manufacturing cost can be further suppressed.

Further, the winding angle θ of the fiber bundle 20 wound around the straight body portion 14 is within a range of θ=54.7 degrees±10 degrees. For example, this 54.7 degrees is an angle derived from the stress in the straight body portion 14 when a predetermined internal pressure is applied. For example, this angle is the equilibrium angle. Further, ±10 degrees is a tolerance allowed when the fiber bundle 20 is actually wound.

Therefore, in the pressure vessel 10, the fiber bundle 20 can bear the stress in the axial direction and the stress in the circumferential direction in the straight body portion 14 in a well-balanced manner when a predetermined internal pressure is applied. That is, in the pressure container 10, the fiber bundle 20 can bear the stress in the axial direction and the stress in the circumferential direction in the straight body portion 14 in a well-balanced manner as compared with the case in which the range of the fiber bundle 20 wound around the straight body portion 14 is not within the range 54.7 degrees±10 degrees. The winding angle θ of the fiber bundle 20 is substantially the same as the inclination angle α of the protrusion 16. Further, in the winding step, the fiber bundle 20 can be wound around the straight body portion 14 without slipping.

In addition, after the fiber bundle 20 is wound around the container body 12, that is, the outer peripheral surfaces of the straight body portion 14 and the dome portion 18 without a gap, the fiber bundle 20 is impregnated with a thermosetting resin and heated to be cured (for example, a hardening process). As a result, the pressure vessel 10 is obtained. The pressure vessel 10 is excellent in corrosion resistance, and can be reduced in weight and cost. Further, the pressure vessel 10 is easy to carry and handle.

In the above description, the pressure vessel 10 according to at least one embodiment has been described with reference to the drawings. However, the pressure vessel 10 according to at least one embodiment is not limited to the one shown in the drawings, and can be appropriately modified in design without departing from the scope of the present disclosure. For example, the container body 12 is not limited to the liquid crystal resin, and may be made of another synthetic resin having a gas barrier property such as high density polyethylene.

The winding angle θ of the fiber bundle 20 with respect to the central axis X of the container body 12 is not limited to 54.7 degrees±10 degrees. The winding angle θ of the fiber bundle 20 is substantially the same as the inclination angle α of the protrusion 16. In the pressure vessel 10, it is desirable for the fiber bundle 20 to be able to bear the stress in the axial direction and the stress in the circumferential direction in the straight body portion 14 in a well-balanced manner when a predetermined internal pressure is applied. Therefore, the inclination angle α of the protrusion 16 and the winding angle θ of the fiber bundle 20 should be such that the fiber bundle 20 can bear the stress in the axial direction and the stress in the circumferential direction in the straight body portion 14 in a well-balanced manner. Furthermore, the method of winding the fiber bundle 20 around the outer peripheral surface of the dome portion 18 is not limited to braiding.

All documents, patent applications, and technical standards mentioned in the present specification are incorporated by reference in the present specification to the same extent as if each individual document, patent application, or technical standard was specifically and individually indicated to be incorporated by reference.

What is claimed is:

1. A pressure vessel, comprising:
    a vessel body that comprises a cylindrical-shaped straight body portion with a spiral-shaped projection portion at an outer peripheral surface of the straight body portion; and
    a covering portion that comprises a fiber bundle wrapped onto the outer peripheral surface of the straight body portion, wherein
    the fiber bundle comprises:
        a first layer wrapped onto the outer peripheral surface of the straight body portion in a first spiral pattern running parallel to the projection portion so as to cover the outer peripheral surface of the straight body portion, and
        a second layer above the first layer, the second layer wrapped in a second spiral pattern along a direction that intersects with the projection portion, and
    a height of the projection portion is less than a thickness of the first layer of the fiber bundle.

2. The pressure vessel according to claim 1, wherein a wrapping angle θ of the first layer of the fiber bundle with respect to an axial direction of the vessel body is within a range of 54.7°±10°.

3. The pressure vessel according to claim 2, wherein an inclination angle of the projection portion with respect to the axial direction of the vessel body is within a range of 54.7°±10°.

4. The pressure vessel according to claim 1, further comprising:
    a thermosetting resin impregnated into the fiber bundle and cured to harden the fiber bundle.

5. A pressure vessel manufacturing method of manufacturing the pressure vessel according to claim 1, the method comprising:
    a molding process of molding the vessel body that comprises the cylindrical-shaped straight body portion such that the spiral-shaped projection portion, which is a protrusion formed by a parting line or by creating a vacuum when the vessel body is extrusion-molded, is formed at the outer peripheral surface of the cylindrical-shaped straight body portion; and
    a wrapping process of wrapping the first layer and then the second layer of the fiber bundle onto the outer peripheral surface of the straight body portion so as to cover the outer peripheral surface of the straight body portion.

6. The pressure vessel manufacturing method according to claim 5, wherein a wrapping angle θ of the first layer of the fiber bundle with respect to an axial direction of the vessel body is within a range of 54.7°±10°.

7. The pressure vessel manufacturing method according to claim 6, wherein an inclination angle of the projection portion with respect to the axial direction of the vessel body is within a range of 54.7°±10°.

8. The pressure vessel manufacturing method according to claim 5, further comprising:
    after the wrapping process, a hardening process of impregnating a thermosetting resin into the fiber bundle that is wrapped onto the outer peripheral surface of the straight body portion and heating the fiber bundle.

9. The pressure vessel according to claim 1, wherein
    the first layer of the fiber bundle is arranged on opposite sides of the projection portion without getting over the projection portion, and
    the second layer of the fiber bundle extends over the projection portion.

10. The pressure vessel according to claim 9, wherein
    the second layer of the fiber bundle extends over the projection portion without contacting the projection portion.

11. The pressure vessel manufacturing method according to claim 5, wherein, in the wrapping process,
    the first layer of the fiber bundle is wrapped to be on opposite sides of the projection portion without getting over the projection portion, and
    the second layer of the fiber bundle is wrapped over the projection portion.

12. The pressure vessel manufacturing method according to claim 11, wherein, in the wrapping process,
    the second layer of the fiber bundle is wrapped over the projection portion without contacting the projection portion.

13. The pressure vessel according to claim 1, wherein
    the second layer of the fiber bundle is directly wound onto the first layer of the fiber bundle, and a gap is between the projection portion and the second layer of the fiber bundle.

* * * * *